United States Patent Office 2,921,971
Patented Jan. 19, 1960

2,921,971

PROCESS AND CATALYST FOR THE POLYMERIZATION OF OLEFINS

Vernon C. F. Holm, Grant C. Bailey, and Alfred Clark, Bartlesville, Okla., assignors to Phillips Petroleum Company, a corporation of Delaware No Drawing. Application March 14, 1956
Serial No. 571,369

14 Claims. (Cl. 260—683.15)

This invention relates to a process for polymerizing olefins catalytically. In one of its more specific aspects, this invention relates to the polymerization of normally gaseous olefin hydrocarbons using a coprecipitated catalyst which comprises silica and nickel oxide. In another aspect, this invention relates to an improved catalyst suitable for polymerizing olefins and a method of producing such a catalyst.

The polymerization of olefins to hydrocarbons of higher molecular weight is a well-known reaction which can be effected by many different processes. Although pressure and heat alone are adequate for such polymerization, it is desirable to use a catalyst. Catalysts are particularly helpful in these processes in that they enable the reaction to proceed at lower temperatures and pressures, increase the yield of desired products and minimize the number of undesirable side reactions which might otherwise occur. It has been established that no catalyst is the exact equivalent of any other catalyst, and that products differing in molecular weight and in molecular structure can be prepared from the same olefin base material by using different catalysts.

We have discovered a new and improved method of polymerizing olefins by employing a coprecitated catalyst which comprises silica and nickel oxide and has been activated by heating in a non-reducing atmosphere, thereby to convert the nickel components to nickel oxide. It is preferred that alumina also be present in the catalyst. We have also found an improved coprecipitated catalyst suitable for use in the polymerization of olefins and a method of making such a catalyst.

It is an object of this invention to provide a process for polymerizing olefins to higher molecular weight hydrocarbons employing a coprecipitated catalyst comprising silica and nickel oxide.

It is another object of this invention to provide a catalytic polymerization process for the production of olefin polymers with improved yields.

It is another object of this invention to provide an improved coprecipitated catalyst suitable for use in olefin polymerization.

It is still another object of this invention to provide a method of preparing such a catalyst.

Other objects and advantages of the present invention will become apparent to those skilled in the art from the accompanying disclosure and description.

This invention is particularly advantageous for polymerizing those olefin hydrocarbons which are normally gaseous, as for example, ethylene, propylene, butene-1, butene-2 and isobutylene. In one of its preferred embodiments, ethylene is polymerized to form a higher-boiling, higher-molecular weight olefin polymer.

The catalyst of this invention comprises silica and nickel oxide, and it is preferable that alumina also be present. In its structural aspect the catalyst components are combined in coprecipitated form. That such a catalyst is capable of producing the excellent results described in the examples of this specification is quite surprising, especially in view of the fact that coprecipitated alumina-nickel oxide has previously been found to be undesirable as a catalyst for the polymerization of ethylene.

In its preferred embodiment, the catalyst of this invention is composed of nickel oxide with a support of silica or silica and alumina. The percentage of each component can vary over a wide range and the catalyst will still retain high activity.

The amount of nickel oxide in the catalyst is generally expressed as a percentage of elemental nickel based on the total weight of the catalyst. In these terms, it can be said that the percentage of nickel can vary from 0.1 to 60 weight percent of the catalyst, but ordinarily not over 35 weight percent. It is preferred that nickel be present in the range of 0.1 to 10 weight percent, and since the more active catalysts contain about 3 to 5 weight percent nickel, catalysts in this general range are ordinarily preferred.

In the balance of the catalyst, which is the support, the percentages of silica and alumina are based on the weight of the support rather than on the catalyst as a whole. While only a very small amount of silica is absolutely necessary (for example 0.1 weight percent) a major portion of silica is preferred. Silica ordinarily can vary from 25 to 100 weight percent of the support. Although it is preferred that at least a small amount of alumina be present in the catalyst, the alumina can vary from 0 to 75 weight percent of the support. The examples of this specification set out typical catalysts for the practice of this invention. As an illustration, in Example I, the supports of the catalysts contain 94 weight percent silica and 10 weight percent alumina. The nickel oxide is present in varying amounts in the different catalysts, ranging from 2 to 60 weight percent nickel, based on the weight of the total catalyst.

The catalyst of this invention is prepared by coprecipitating the hydrous oxides of silicon and nickel with or without that of aluminum, and converting the nickel component to nickel oxide by heating in a non-reducing atmosphere at a temperature in the range of 300 to 700° C. One method of the effecting such a coprecipitation is set out in detail in Example I of this specification. By the terms "precipitation" and "coprecipitation" as used throughout this specification and in the appended claims, we means to include the phenomena of "gelation" and "cogelation" as well as the more commonly understood meanings of these terms.

In general, the preferred method for preparing the catalyst comprises the following steps:

(1) *Forming two solutions of the catalyst components.*—One of these is an aqueous solution of an alkali silicate, such as sodium silicate; and the other is an aqueous solution of a nickel salt, preferably the nitrate, chloride or the like. The nickel solution also contains aluminum salts when it is desired that alumina be present in the catalyst. The nickel-aluminum solution should be sufficiently acid so that these components do not prematurely precipitate. Concentrations of the salts in each solution are controlled to give from 0.5 to 10 parts by weight of catalyst of the desired composition in 100 parts by weight of water. It is preferable that the coprecipitation be effected in such a manner that from 1.5 to 4 parts by weight of catalyst are formed in 100 parts by weight of water.

(2) *Combining the two solutions in such a manner that the coprecipitate is not formed until the mixing is complete.*—This can be done by adding the silicate solution to a nickel-aluminum solution with vigorous stirring, or by continuously blending the two solutions. The mixture is then adjusted to the desired final pH by the addition of alkaline solution such as aqueous sodium hydroxide. The final pH of the mixture should be in the range of 6.5 to 9.0 and preferably in the range of 7.5 to 8.5. The coprecipitation can be effected over a considerable range of temperatures, temperature not being a critical feature. Ordinary room temperature is commonly used, for example, from 60 to 100° F. An alternative preferred method for forming the coprecipitate is to adjust the alkalinity of the silicate solution so that when combined with the nickel-aluminum solution, the final pH will be in the range of 6.5 to 9.0, preferably 7.5 to 8.5. The two solutions are then blended rapidly, as by means of a centrifugal pump, so that thorough mixing is complete prior to the onset of precipitation. Other methods of combining the two solutions will be apparent to those skilled in the art, but it is important that the two solutions be homogeneously mixed prior to the onset of precipitation.

(3) *Filtering the coprecipitate, drying it, and then washing the dried coprecipitate to remove alkali metal ions.*—It is desirable to wash the coprecipitate with a solution of a volatile salt, such as ammonium chloride or ammonium nitrate, in order to effect a base exchange and removal of sodium or alkali metal ions. The catalysts of this invention are operable even though the sodium ions are not removed. In polymerization processes as described, conversion has been effected with catalysts having as high as 3.2 weight percent sodium present. However, high sodium contents are harmful to the activity of the catalyst and it is preferred that the sodium content be reduced to less than 0.1 weight percent of the final catalyst. As shown by the examples of this specification, it is possible to reduce the sodium content to less than 0.02 weight percent by proper washing of the coprecipitate.

After the coprecipitate is recovered, it is transformed into the catalyst of this invention by converting the nickel component of the coprecipitate into nickel oxide. This is done by heating in a non-reducing atmosphere at a temperature in the range of 300 to 700° C., preferably in the range of 400 to 600° C., for from 0.5 to 24 or even 48 hours, a longer heating time being required for the lower temperatures, although ordinarily little is gained by extending the heating period beyond 24 hours. Air can be used for a suitable non-reducing atmosphere. The catalyst thus formed is excellent for polymerizing olefins as evidenced by the examples of this specification.

With the exception of the use of the catalyst of this invention, the polymerization process can be carried out by methods well known in the art. A polymerizing process as described in the U.S. Patent 2,606,940 issued in 1952 to Bailey, et al., is suitable. In such a process, the olefin hydrocarbons are purified, if necessary, to remove any materials which would tend to deactivate or poison the catalyst. The olefins are then introduced into a polymerization zone where they are contacted with the catalyst of this invention. The polymerization can be performed with or without a diluent such as paraffin or cycloparaffin although the presence of an inert diluent is often desirable to facilitate removing the product from the reaction zone during the operation. The polymerization temperature is generally in the range of 50 to 325° C. The maximum operating temperature is limited from a practical standpoint by undesirable side reactions, such as cracking and aromatization, which becomes significant at temperatures above about 350° C. Although the process is operable to produce some polymer at 400° C. or higher, the preferred operating temperature is in the range indicated and depends upon the products desired and other conditions imposed upon the system, such as pressure, diluent, and the like. The pressure range which is suitable is quite wide, including atmospheric, sub-atmospheric, and elevated pressures. High pressures generally favor polymerization, and pressures as high as 2000 pounds per square inch and above can be used. In general, it can be said that the average molecular weight of the polymer formed is an inverse function of temperature and a direct function of operating pressure and reaction contact time.

A better understanding of this invention can be gained by referring to the following examples which are meant to be exemplary only, and not to limit unduly the scope of this invention:

EXAMPLES

In these examples, processes using several embodiments of the coprecipitated catalyst of this invention are compared with processes using impregnated catalysts of similar composition.

*Example 1*

The impregnated catalysts were made by treating a commercial synthetic cracking catalyst with an appropriate nickel nitrate solution. The cracking catalyst contained about 90 percent silica and 10 percent alumina. It had a surface area of about 315 square meters per gram and was obtained in the form of pills which were broken and sized so that a 16–30 mesh fraction could be used for impregnation thereof. As an example, the preparation of the catalyst which contained about 3 percent nickel will be described. Fifty milliliters of the 16–30 mesh support was treated with 75 milliliters of a 0.8 molar nickel nitrate solution. After about 15 minutes, the support was drained and then dried with constant stirring. After drying in an oven at 110° C., the catalyst was heated to 500° C., in a stream of dried air and held at this temperature for five hours, in the course of which the nickel nitrate was converted to nickel oxide.

The preparation of the coprecipitated catalyst may best be illustrated with the procedure for making a nickel oxide-silica-alumina catalyst containing about 5 weight percent nickel. Two solutions were prepared, one containing 180 grams of N-Brand sodium silicate (28.6 weight percent $SiO_2$, 8.42 weight percent $Na_2O$, and the balance water) and 1200 milliliters of water, and the other solution containing 42 grams of aluminum nitrate nonahydrate, 14.85 grams of nickel nitrate hexahydrate, and 6.3 milliliters of concentrated nitric acid in one liter of water. The silicate and nickel-aluminum solutions were then mixed during vigorous stirring. After thorough mixing, a solution of 5 grams of sodium hydroxide in 100 milliliters of water was added with continued stirring. The resulting pH was 8.0. Within about 5 minutes, a gel formed which was allowed to stand for about an hour and then drained and the excess liquid removed with suction. The gel was broken up and dried under heat lamps overnight, after which it was dried for several hours in an oven at 110° C. The dried coprecipitate was washed twice by decantation with water and then treated with 6 or 8 successive portions of 5 percent ammonium chloride solution at 70° C., for removal of sodium by base exchange. The product was then washed 8 or 10 times with water, drained and dried at 110° C. The catalyst was activated by heating slowly to 550° C. in a stream of dry air and holding this temperature for 16 hours. This procedure produced catalyst with adequate surface area and sodium contents lower than 0.02 percent. Catalysts with other nickel contents were prepared to contain silica and alumina in the same ratio of 9 to 1.

The polymerization tests were made using ethylene and a reactor equipped with an axial thermocouple well that permitted temperature measurements on the catalyst bed which was supported on a perforated glass platform in the hot zone of the reactor. The reactor was mounted in a vertical tube furnace fitted with a heavy metal sleeve for temperature equalization. Dried ethylene was admitted at the top from a calibrated flowrator and the reacted mixture was passed through a trap cooled by a Dry Ice bath below the reactor. The unreacted ethylene from the trap was passed through a second calibrated flowrator. Thus, with a given flow rate of ethylene, readings of the second flowrator made possible a satisfactory calculation of the instantaneous values for the conversion of ethylene to dimers, trimers, and higher polymers.

Prior to each run, the reactor was charged with catalyst and, with a slow stream of dry nitrogen flowing over the catalyst, the furnace was heated to 400° C., held at this temperature for about one hour, and cooled to room temperature overnight. With the refrigerated receiver in place, the nitrogen flow was stopped and the flow of research grade ethylene of about 99.9 mol percent purity, as determined by mass spectrometer, was started at a gaseous flow rate of about 2500 standard volumes of gas per volume of catalyst. The furnace was set at a voltage in order to attain a temperature of 300° C. in two hours. Flowrator and temperature readings were made at five minute intervals. The conversion of ethylene to higher molecular weight hydrocarbons was noted over the entire temperature range to 300° C., and the various catalysts were compared on the basis of conversion over the temperature range. Maximum conversion occurred at the maximum temperature of 300° C., and it was found that catalyst performance at this maximum temperature formed a sound basis for tabular comparison of performances over the entire range of temperatures. This comparison is set forth in Table I:

TABLE I.—COMPARISON OF COPRECIPITATED AND IMPREGNATED NICKEL OXIDE-SILICA-ALUMINA CATALYSTS FOR ETHYLENE POLYMERIZATION

| Method of Preparing Catalyst | Weight Percent Nickel in Catalyst | Approximate Catalyst Surface area (Sq. Meters per Gram) | Percent Ethylene Polymerization at Maximum Conversion |
|---|---|---|---|
| Impregnated | 0.85 | 300 | 24 |
| Do | 1.71 | 300 | 32 |
| Do | 3.15 | 300 | 54 |
| Do | 10.8 | 253 | 36 |
| Coprecipitated | 2.54 | 374 | 65 |
| Do | 4.48 | 388 | 75 |
| Do | 8.30 | 248 | 35 |
| Do | 17.26 | 259 | 28 |
| Do | 37.82 | 302 | 35 |
| Do | 60.26 | 219 | 30 |

*Example II*

Several impregnated and coprecipitated silica-nickel oxide catalysts were prepared using procedures parallel to those outlined in Example I, except for the differences in composition and the gaseous flow rate, which was about 500 standard volumes of gas per volume of catalyst. These catalysts were likewise compared for activity in the polymerization of ethylene; and although the coprecipitated silica-nickel oxide catalysts did not indicate activity as high as the coprecipitated silica-nickel oxide-alumnia catalysts, they exhibited higher activity than the impregnated silica-nickel oxide catalysts of comparable composition. A comparison of these catalysts on the same basis as that used for Example I is shown in Table II.

TABLE II.—COMPARISON OF COPRECIPITATED AND IMPREGNATED SILICA-NICKEL OXIDE CATALYSTS FOR ETHYLENE POLYMERIZATION

| Method of Preparing Catalyst | Weight Percent Nickel in Catalyst | Approximate Catalyst Surface Area (Square Meters per Gram) | Percent Ethylene Polymerization at Maximum Conversion |
|---|---|---|---|
| Impregnated | 1.8 | | 29 |
| Do | 2.86 | 598 | 32 |
| Do | 5.75 | | 43 |
| Do | 10.56 | 490 | 39 |
| Coprecipitated | 2.95 | 269 | 59 |
| Do | 4.77 | 359 | 64 |
| Do | 4.96 | 272 | 49 |
| Do | 9.38 | 345 | 60 |
| Do | 19.1 | | 65 |

It is evident from the above examples and the data shown in Tables I and II that increased yields for the polymerization of ethylene can be realized by using a coprecipitated catalyst of this invention. It should be noted that, in general, where the nickel content of the coprecipitated catalyst is in the preferred range, the surface area of the coprecipitated catalyst is also at a maximum. Although correlation between activity and surface area may exist in a given series, no such correlation can be made in considering catalysts of different compositions or representing different methods of preparation.

We claim:

1. A process of preparing a catalyst suitable for use in the polymerization of olefins which comprises coprecipitating from solution the catalyst components comprising the hydrous oxides of silicon and nickel; separating the coprecipitate from the solution materials; and activating said coprecipitate by heating in a non-reducing atmosphere at a temperature in the range of 300 to 700° C. thereby to convert said nickel component to nickel oxide.

2. A process of preparing a catalyst suitable for use in the polymerization of olefins which comprises coprecipitating from solution the catalyst components comprising the hydrous oxides of silicon, aluminum and nickel; separating the coprecipitate from the solution materials; and activating said coprecipitate by heating in a non-reducing atmosphere at a temperature in the range of 300 to 700° C. thereby to convert said nickel component to nickel oxide.

3. A process of preparing a catalyst suitable for use in the polymerization of olefins which comprises mixing an aqueous solution of an alkali silicate with an aqueous solution selected from the group consisting of a solution of nickel salts and a solution of nickel and aluminum salts, thereby forming a coprecipitate of the catalyst components; filtering said coprecipitate; drying said coprecipitate; washing said coprecipitate to remove alkali metal ions therefrom; and activating said coprecipitate by heating in a non-reducing atmosphere at a temperature in the range of 300 to 700° C., thereby to convert the nickel components to nickel oxide.

4. A process of preparing a catalyst suitable for use in the polymerization of olefins which comprises forming an aqueous solution of sodium silicate; forming an aqueous solution of aluminum nitrate and nickel nitrate; mixing said silicate and nitrate solutions; adjusting the alkalinity of the resultant solution so to obtain a pH in the range of 6.5 to 9.0, thus forming a coprecipitate of silica, alumina, and nickel components after the solutions are thoroughly combined; filtering said coprecipitate, drying said coprecipitate, washing said coprecipitate with water and a solution of a volatile ammonium salt to remove sodium ions from said coprecipitate; and activating said coprecipitate by heating in a non-reducing atmosphere at a temperature in the range of 300 to 700° C. for at least 0.5 hours, thereby to convert said nickel components to nickel oxide.

5. A catalyst suitable for use in the polymerization of olefins, prepared by the process of claim 1 and comprising silica and nickel oxide.

6. A catalyst suitable for use in the polymerization of olefins prepared by the process of claim 2 and comprising silica, alumina and nickel oxide.

7. A catalyst suitable for use in the polymerization of normally gaseous olefins and prepared by the process of claim 3, consisting essentially of 0.1 to 35 weight percent nickel as nickel oxide and the balance supporting materials consisting essentially of from 25 to 100 percent silica and from 0 to 75 weight percent alumina.

8. A process for the polymerization of olefins comprising forming a coprecipitate of silica, alumina, and nickel components; activating said coprecipitate by heating in a non-reducing atmosphere at a temperature in the range of 300 to 700° C., thereby to convert said nickel component to nickel oxide and form a catalyst composition, contacting a polymerizable olefin hydrocarbon with said catalyst composition in a reaction zone under polymerization conditions, and recovering therefrom a polymer product.

9. A process for the polymerization of olefins comprising contacting said olefins under polymerization conditions with a composition comprising silica and nickel oxide, said composition having been formed by coprecipitation and activated by heating in a non-reducing atmosphere at a temperature in the range of 300 to 700° C.

10. A process for the polymerization of olefins comprising contacting said olefins under polymerization conditions with a composition comprising silica, alumina and nickel oxide, said composition having been formed by coprecipitation and activated by heating in a non-reducing atmosphere at a temperature in the range of 300 to 700° C.

11. A process for the polymerization of olefins comprising introducing said olefins into a reaction zone under polymerization conditions, and catalyzing said polymerization by contacting said olefins with a catalyst composition consisting essentially of silica, alumina, and nickel oxide, said catalyst components having been coprecipitated from solution and activated by heating in a non-reducing atmosphere at a temperature in the range of 300 to 700° C.

12. A process for the polymerization of normally gaseous olefin hydrocarbons comprising introducing said olefin hydrocarbons into a reaction zone under polymerization conditions and catalyzing said polymerization by contacting said olefin hydrocarbons in the reaction zone with a catalyst composition consisting essentially of from 0.1 to 35 weight percent nickel as nickel oxide and balance supporting materials consisting essentially of from 25 to 100 weight percent silica and from 0 to 75 weight percent alumina, said catalyst components having been coprecipitated from solution at a pH in the range of 6.5 to 9.0 and activated by heating in a non-reducing atmosphere at a temperature in the range of 300 to 700° C. for at least 0.5 hours, said heating serving to convert the nickel components to said nickel oxide.

13. A process for the polymerization of normally gaseous olefin hydrocarbons comprising introducing said olefin hydrocarbons into a reaction zone under polymerization conditions and catalyzing said polymerization by contacting said olefin hydrocarbons in the reaction zone with a catalyst composition consisting essentially of from 0.1 to 10 weight percent nickel as nickel oxide and the balance supporting materials consisting essentially of from 25 to 100 weight percent silica and from 0 to 75 weight percent alumina, said catalyst components having been coprecipitated from solution at a pH in the range of 7.5 to 8.5 and activated by heating in a non-reducing atmosphere at a temperature in the range of 400 to 600° C. for at least 0.5 hour, thereby to convert the nickel components to said nickel oxide.

14. A process according to claim 13 wherein said olefin hydrocarbon is ethylene and said polymerization conditions include a temperature in the range of 50 to 325° C.

References Cited in the file of this patent

UNITED STATES PATENTS

| | | |
|---|---|---|
| 1,391,666 | Bosch et al. | Sept. 27, 1931 |
| 2,040,233 | Adkins | May 12, 1936 |
| 2,606,940 | Bailey et al. | Aug. 12, 1952 |
| 2,645,620 | Paterson et al. | July 14, 1953 |
| 2,658,875 | Schuit et al. | Nov. 10, 1953 |
| 2,700,663 | Peters | July 25, 1955 |
| 2,713,044 | McArthur | July 12, 1955 |
| 2,741,602 | McKinley | Apr. 10, 1956 |

FOREIGN PATENTS

| | | |
|---|---|---|
| 13,382 | Great Britain | May 28, 1914 |